United States Patent [19]

Grinberg et al.

[11] Patent Number: 4,537,471

[45] Date of Patent: Aug. 27, 1985

[54] LIQUID CRYSTAL PIXEL DRIVER CIRCUIT AND MATRIX DISPLAY

[75] Inventors: Jan Grinberg, Los Angeles; Michael J. Little, Tarzana, both of Calif.

[73] Assignee: Hughes Aircraft Company, El Segundo, Calif.

[21] Appl. No.: 564,954

[22] Filed: Dec. 23, 1983

[51] Int. Cl.³ .................................................. G02F 1/13
[52] U.S. Cl. ...................................... 350/333; 350/332
[58] Field of Search ............................... 350/333, 332

[56] References Cited

U.S. PATENT DOCUMENTS

| | | | |
|---|---|---|---|
| 4,158,860 | 6/1979 | Irie et al. ........................ | 350/333 X |
| 4,319,237 | 3/1982 | Matsuo et al. .................. | 350/333 X |
| 4,386,352 | 5/1983 | Nonomura et al. ............ | 350/333 X |
| 4,431,271 | 2/1984 | Okubo ............................ | 350/333 X |

Primary Examiner—John K. Corbin
Assistant Examiner—Richard F. Gallivan
Attorney, Agent, or Firm—G. D. Ogrod; J. A. Sarjeant; A. W. Karambelas

[57] ABSTRACT

The present invention provides a liquid crystal light valve pixel driver circuit comprising a pair of power electrodes, a pair of half-pixel electrodes, each half-pixel electrode being associated with a respective one of the power electrodes and a transistor switch for selectively conductively interconnecting the pair of half-pixel electrodes, the transistor switch being responsive to an applied data voltage potential. A strobe transistor and capacitor are further associated with the driver circuit to enable the demultiplexing of data from a data line and the transfer of a data representing voltage potential to the capacitor for application to the transistor switch.

9 Claims, 5 Drawing Figures

LIQUID CRYSTAL PIXEL DRIVER CIRCUIT AND MATRIX DISPLAY

BACKGROUND OF THE INVENTION

1. Field of the Invention

The present invention is generally related to matrix-type liquid crystal light valve (LCLV) displays and their associated drive circuitry and, particularly, to the driver circuit utilized for activating each of the pixels of a matrix LCLV display.

2. Description of the Prior Art

In the development of high pixel density matrix LCLV displays, there is a growing need for a pixel driver circuit having an optimal circuit design. The needs that must be met include low power dissipation, minimum circuit component count, minimum size components, minimum electrical contacts to and within the circuit, optional routing of electrical leads and placement of the contacts to minimize crossovers, flexibility to provide either DC or true AC activation of the liquid crystal material, and the capability to ensure time and temperature stable operation of the liquid crystal material.

Prior existing pixel driver circuits can be characterized by the number of transistors present in the designs. Single transistor driver circuits typically include a strobe transistor for selectively passing data from a data line to a storage capacitor. The discharge path of the storage capacitor passes through the liquid crystal pixel, thereby providing contrast control dependent on the voltage potential established across the storage capacitor. Due to the necessarily short strobe period associated with high density matrix LCLV displays, the data current through the strobe transistor (high multiplexing ratio) may be extremely high. Also, the exponential rate of discharge of the data storage capacitor is highly dependent on time due to the low, variable pixel impedance, thus resulting in a relatively unstable pixel contrast characteristic. Naturally, there is also a time and temperature critical refresh period, based on the display frame rate, associated with such a driver circuit. Finally, true AC activation of the liquid crystal pixel cannot be accomplished utilizing this single transistor driver circuit, the pixel activation being inherently dependent on the polarity of the data potential.

A two-transistor driver circuit exists that overcomes a number of the limitations inherent in the design of the single transistor driver circuit. A strobe transistor is utilized to pass data from a data line to a data storage capacitor, as in the single transistor driver circuit. The discharge path of the data storage transistor, however, is into the gate electrode of a second transistor. The drain of the second transistor is connected to a power supply and the source of the transistor is connected to an electrode of the liquid crystal pixel so as to provide an alternate, data dependent current path through the liquid crystal pixel to ground. The placement of the gate electrode of the second transistor in the current discharge path of the data storage capacitor greatly reduces the needed charge storage capacity of the capacitor and the current handling capability of the strobe transistor. Thus, the size of the capacitor and the power dissipation of the circuit as a whole are reduced. However, all other limitations of the single transistor driver circuit remain essentially uncorrected in this two-transistor driver circuit.

SUMMARY OF THE INVENTION

It is, therefore, the purpose of the present invention to provide a highly versatile liquid crystal light valve pixel driver circuit that is suited, in particular, to high density matrix liquid crystal displays and that overcomes the attendant disadvantages of the prior existing driver circuits.

This is accomplished in the present invention by providing a liquid crystal light valve pixel driver circuit comprising a pair of power electrodes, a pair of half-pixel electrodes, each half-pixel electrode being associated with a respective one of the power electrodes and a first transistor switch for selectively conductively interconnecting the pair of half-pixel electrodes, the first transistor switch being responsive to an applied data voltage potential.

Thus, an advantage of the present invention is that it provides a circuit having a relatively simple design that retains all of the desirable qualities of the prior-existing driver circuits.

Another advantage of the present invention is that it permits either DC or true AC activation of the liquid crystal light valve pixel.

A further advantage of the present invention is that the circuit design provides a self-compensating effect so as to ensure both short and long term contrast level stability and linearity.

Still another advantage of the present invention is that it can be utilized equally in simple digital, gray-scale, and analog applications.

A still further advantage of the present invention is that it inherently provides for a balanced, optimal placement of the required power supply and signal electrical leads, thereby being easily adaptable to extremely high pixel density matrix LCLV displays.

Yet another advantage of the present invention is that it utilizes a dual function strobe line as a ground lead as well as a means for providing a strobe signal, thereby reducing by one the number of leads required and a proportional number of lead crossovers.

BRIEF DESCRIPTION OF THE DRAWINGS

Other attendant advantages and further features of the present invention will become apparent and readily appreciated as the same becomes better understood by reference to the following Detailed Description of the Invention when considered in connection with the accompanying Drawings, where like reference numerals designate like parts throughout the figures, and wherein.

DETAILED DESCRIPTION OF THE INVENTION

Figure 1A:
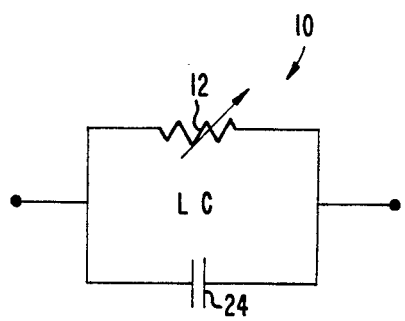
FIG. 1a shows a simplified equivalent circuit schematic of a pixel of a matrix liquid crystal light valve display.
Figure 1B:
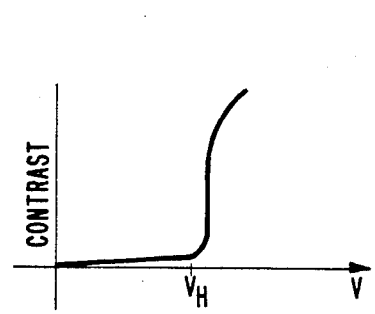
FIG. 1b is a graph illustrating the voltage to contrast characteristic of a liquid crystal light valve pixel.

A simplified circuit diagram of a liquid crystal cell or an individual pixel of a matrix type liquid crystal display is indicated by the reference numeral 10 in FIG. 1a. Electrically, each pixel acts as a two terminal device comprising, in parallel, a variable resistor 12 and a capacitor 14. The two terminals of the liquid crystal element 10 are, effectively, the two opposing liquid crystal cell electrodes. The value of the capacitor 14 is largely determined by the dielectric constant of the liquid crystal material interposed between the two cell electrodes, as well as the spacing thereinbetween. Since the liquid crystal material is significantly conductive, the parallel resistor 12 has a finite, non-negligable value. FIG. 1b illustrates the voltage to contrast characteristic typical of liquid crystal cells. Although there are many operational considerations that are dependent on the particular liquid crystal material, its initial induced alignment, and the electrically induced mode of reorientation, a liquid crystal cell will typically evidence a rapid change in contrast as a voltage potential is applied across the cell having a magnitude greater than a threshold voltage, $V_{th}$. The term "contrast" as used herein is meant to include relative opacity with regard to either unpolarized or polarized light, or both. While the contrast voltage threshold value is neither uniquely defined nor constant with regard to all liquid crystal cells, a typical voltage threshold is approximately 1 volt.

The resistor 12 and capacitor 14 equivalent elements of a liquid crystal cell 10 are not ideally constant. The capacitance and, in particular, the resistive value of the liquid crystal cell 10 are dependent on the operational temperature and age of the liquid crystal material. With either increasing temperature or age, or both, the equivalent resistance of the liquid crystal cell typically decreases. This impacts many prior existing liquid crystal driver circuits, such as by increasing the discharge current through the liquid crystal cell, thereby prematurely causing the voltage across the cell to fall near or below the contrast voltage threshold. This results in loss of the desired level of opacity.

Figure 2:
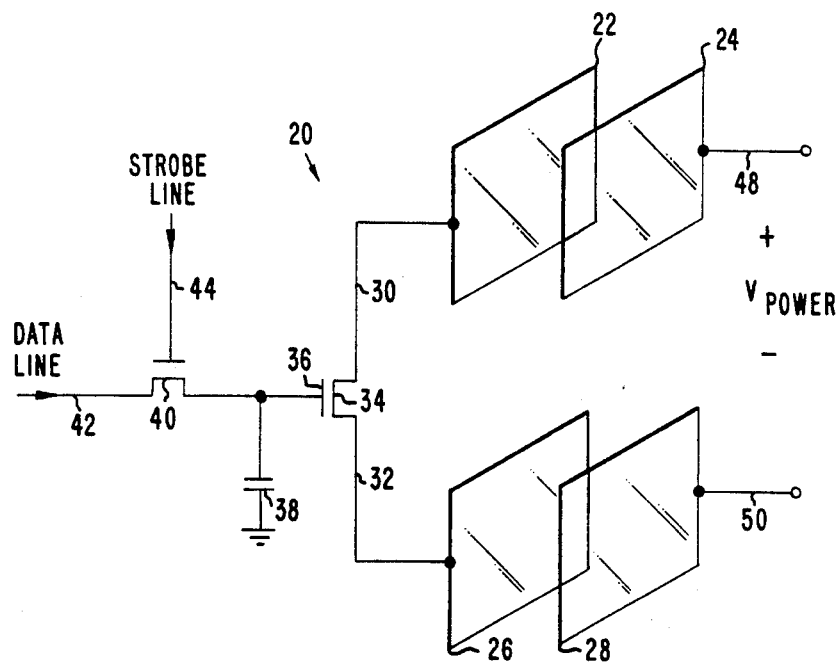
FIG. 2 is a circuit schematic of the pixel driver circuit of the present invention.

Referring now to FIG. 2, the circuit design of the preferred embodiment of the present invention, indicated by the reference numeral 20, is shown. The pixel driver circuit 20 includes a pair of power electrodes 24, 28, a respective pair of parallel opposing half-pixel electrodes 22, 26, a pixel drive transistor 34, a pixel data storage capacitor 38, and a strobe transistor 40. In operation, data is provided to the circuit 20 on data line 42 connected to the strobe transistor 40. The data may take the form of either a digitized or analog voltage potential. For a short period of time when the data is valid on the data line 42, a strobe signal is provided on the strobe line 44 to the strobe transistor 40. This enables the transfer of the then present data from the data line 42 to the data storage capacitor 38 by allowing the representative voltage potential to be impressed across the capacitor 38. The strobe signal need be applied only for so long as necessary to charge the data storage capacitor 38 to the data representative voltage potential. The strobe signal is then removed. Due to the absence of a significant current discharge path, a relatively time invarient voltage potential is thus provided to the gate 36 of the pixel drive transistor 34. The source 30 and drain 32 contact leads of the pixel driver transistor 34 are respectively connected to the half-pixel electrodes 22, 26. The corresponding power electrodes are connected via power leads 48, 50 to a power supply (not shown) capable of providing a voltage potential difference thereinbetween. Thus, a current conduction path passing twice through the liquid crystal material, once associated with each corresponding pair of power 24, 28 and half-pixel 22, 26 electrodes, respectively, is established.

The pixel driver transistor 34 generally acts to limit the current flow through the liquid crystal material based on its transconductance as established by the voltage potential applied to its gate electrode 36. The preferred nature and operating characteristics of the pixel driver transistor 34 are selected in view of a number of criterion. First, the transistor 34 is preferably a FET so as to be suitable for bilateral operation. Bilateral is hereindefined as meaning that the driver transistor 34 is substantially insensitive to the direction of current flow through the device. Consequently, the driver transistor 34 will operate equally regardless of the particular polarity of the voltage potential applied between the power leads 48, 50 or even whether a time varying voltage potential is applied. This enables the present invention to operate from a DC, a true sinusoidally varying AC, or even a duty cycle varying square wave voltage potential.

Second, the driver transistor 34 is further preferably of an insulated gate design, such as a standard MOSFET, so as to have an extremely high gate electrode 36 impedance. This is significant in that it greatly reduces the necessary capacitive value of the capacitor 38. In fact, an alternate embodiment of the present invention is contemplated wherein the data storage capacitor 38 is effectively formed by the metal trace interconnecting the strobe transistor and the gate electrode 36 due to its associated stray capacitance. This is achieved by efficiently trapping an amount of charge, or absence of charge, representing the desired data value on the metal trace.

Finally, the operating characteristics of the drive transistor 34 are selected in view of the anticipated range of voltage drop across each parallel opposing pair of electrodes 22, 24 and 26, 28 as well as the peak voltage potential difference provided to the power supply lines 48, 50 by the power supply. Preferably, the characteristics are such that the driver transistor 34 will operate substantially within its linear operating range for all data values within the anticipated range of data.

Naturally, it is desirable to have a contrast range extending from 0 to 100% contrast that predictably and uniformly tracks the corresponding range of data values. This is uniquely obtained in the present invention by the electrically symmetrical placement of the half-pixel electrodes 22, 26 about the pixel driver transistor 34. This effectively creates a negative feed back loop that stabilizes the contrast level of the liquid crystal pixel for any particular gate electrode 36 voltage potential. That is, for a given maximum power supply voltage potential difference and gate electrode 36 voltage potential, any change in the effective resistance or impedance of the liquid crystal material due to aging or change in operational temperature, will tend to change the current flow through and voltage drop between each of the parallel opposing pairs of electrodes 22, 24 and 26, 28. The impedances associated with each of the parallel opposing pairs of electrodes 22, 24 and 26, 28 will always be substantially equal, since each electrode pair is of approximately the same geometrical size and configuration and associated with the same liquid crystal material mixture. In response to any change in impedance, there will tend to be an opposite or relatively negative change in the drain to source voltage potential across the pixel driver transistor 34. As is known regarding the operation of FET transistors biased within their linear operating range, the conductance of the device will increase with increasing drain to source potential differences for a given gate electrode potential. See, MOS/LSI Design and Application, W. N. Carr and D. P. Mize, McGraw-Hill, 1972 pgs. 52–54. In the present invention, this results in a proportional change in the amount of current passing through the pixel driver transistor 34 and between the parallel opposing electrodes 22, 24 and 26, 28 such that the voltage difference between these electrode pairs will remain substantially constant irrespective of changes in the impedance of the liquid crystal material. Thus, the contrast level of the liquid crystal material associated with the corresponding electrode pairs 22, 24 and 26, 28 will closely track the voltage potential at the gate electrode 36, as a result of the pixel drive transistor 34 automatically compensating for any fluctuations in operating temperature or age related change in the electrical characteristics of the liquid crystal material. Consequently, the present invention, as embodied in the pixel driver circuit 20 of FIG. 2, is ideally suited for the display of analog and digitized gray-scale information, in addition to simple binary digital information, due to the relative invariance of the contrast levels associated with data provided to the driver circuit 20.

Figure 3:
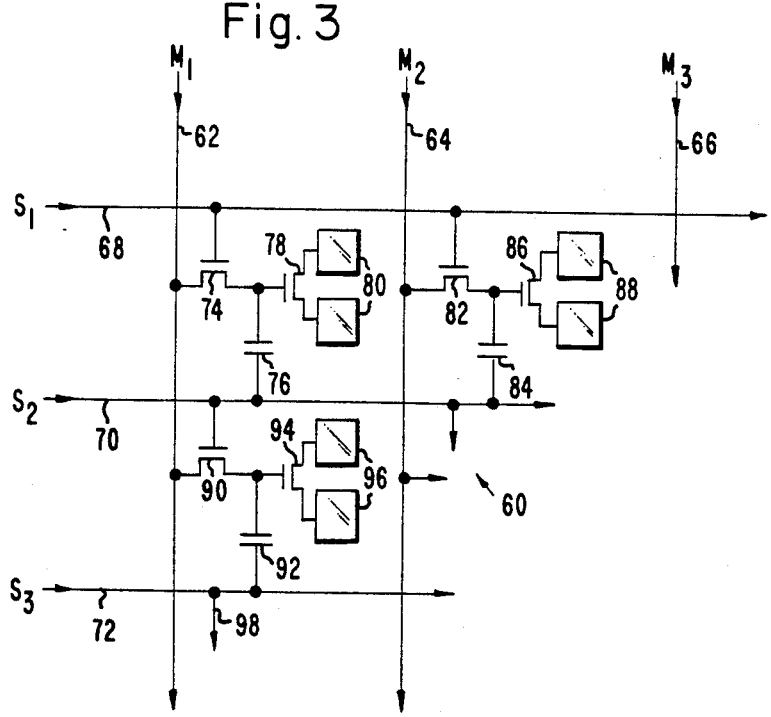
FIG. 3 is a representational circuit schematic of a matrix array of pixel driver circuits in accordance with the present invention.

As mentioned above, the present invention may be advantageously utilized as part of a matrix liquid crystal display. An upper, left hand portion of a electric matrix circuit, as indicated by the reference numeral 60, necessary to implement the matrix display is shown in FIG. 3. The electric matrix is formed by a plurality of data lines 62, 64, 66 and strobe lines 68, 70, 72. A pixel driver circuit 20, substantially equivalent to that shown in FIG. 2, is associated with each unique combination of data and strobe lines. As is typical for a matrix liquid crystal display, multiplexed data is provided on each of the data lines and a strobe signal, for demultiplexing the data, is sequentially applied to each of the strobe lines; the strobe lines are otherwise maintained at a reference or ground voltage potential. Thus, data is gated by the respective strobe transistors 74, 82, 90 on a row by row basis to their respective data storage capacitors 76, 84, 92, thereby refreshing or updating the respective data contrast levels affected by their corresponding half-pixel electrodes 80, 88, 96.

A particular advantage of utilizing the present invention in a matrix liquid crystal display embodiment is that it permits the optimization of the routing of the electrical leads and the minimization of the number of electrical contacts that must be made within the display area of the liquid crystal display. As shown in FIG. 3, the necessity of a separate reference or ground potential lead to each of the individual pixel driver circuits is effectively obviated for two reasons. First, the ground potential for referencing the data voltage potential applied across the data storage capacitors is obtained by connecting the capacitors between their respective gate electrodes and the strobe line of an adjacent or otherwise different line of pixel driver circuits. As noted above, the strobe lines are preferably maintained at the reference voltage potential at all times other than their respective row refresh periods. Since these refresh periods are typically short compared to the entire time necessary to refresh the entire display and with respect to the response time of the liquid crystal material itself, there is no significant degradation in the quality of the display as a result. Further, should the use of data storage capacitors be obviated by effectively utilizing the stray capacitance of the electrical line associated with the gate electrode to store the data, the contacts and leads of the data storage capacitor would be similarly obviated.

Second, and perhaps of greater advantage, is that the power supply leads associated with the power electrodes, while not obviated, are optimally placed on the parallel opposing electrode surface of the liquid crystal display. Thus, they are provided on a display electrode surface distinct from the electrode surface upon which the electrical matrix of FIG. 3 is provided and, therefore, may be routed independently. This is effectively shown in FIG. 4 wherein the electrodes associated with a portion of a single row of pixels are shown. The half-pixel electrodes 114, 116 and 118, 120 and 122, 124 are provided on one electrode surface (not shown) of a liquid crystal display along with their respective pixel driver circuit as represented by the pixel driver transistors 106, 104, 102. The power electrodes 110, 112 are provided on the parallel opposing electrode surface (not shown) thereby obviating any need for electric crossovers.

Figure 4:
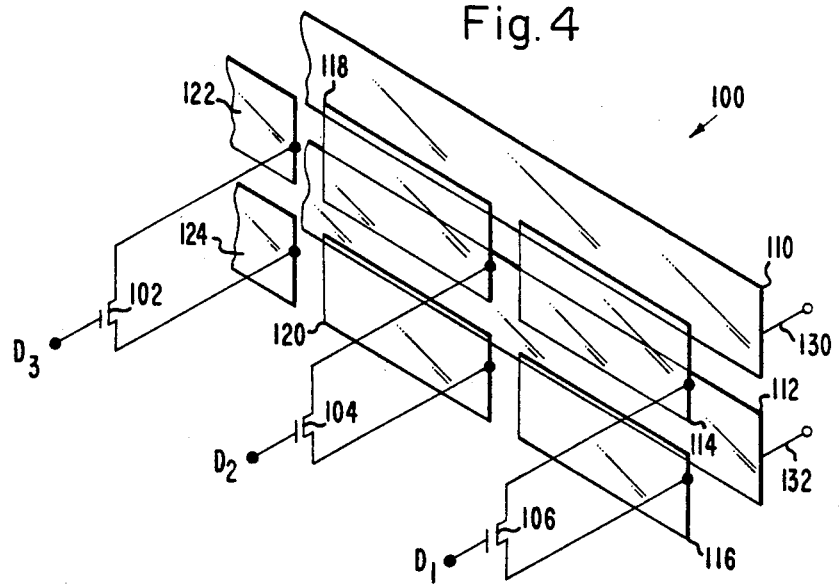
FIG. 4 is a representational perspective view of the preferred liquid crystal light valve pixel electrode orientation of a single row of pixels.

The present invention further provides for the optimization of the routing and contact of the power supply leads 130, 132 to the power electrodes 110, 112, as generally shown in FIG. 4. This is accomplished by utilizing a pair of strip power electrodes for each row of the display. Thus, individual power leads to each pixel of the display are obviated. As shown in FIG. 4, each strip power electrode 110, 112 is provided so as to parallel oppose a corresponding one of the pairs of half-pixel electrodes 114, 118, 122, 116, 120, 124. Thus, the total number of electrical power leads are substantially reduced with a corresponding reduction in the number of necessary lead crossovers.

In summary, there has been described a liquid crystal light valve pixel driver circuit having an optimal individual circuit configuration and, further, an optimal arrangement of such pixel driver circuits that can advantageously be utilized in a matrix liquid crystal display.

Obviously, many modifications and variations of the present invention are possible in light of the above teachings. It is, therefore, to be understood that, within the scope of the appended claims, the invention may be practiced otherwise than as specifically described.

What is claimed is:

1. A liquid crystal light valve pixel driver circuit comprising:
  (a) a pair of power electrodes having a voltage potential applied thereinbetween;
  (b) a pair of half-pixel electrodes, each of said half-pixel electrodes being associated with a respective one of said power electrodes; and
  (c) a first transistor switch selectably conductively interconnecting said half-pixel electrodes, said first transistor switch being responsive to an applied voltage data potential.

2. The circuit of claim 1 wherein the voltage potential applied between said power electrodes is characterized as an AC voltage potential.

3. The circuit of claim 1 further comprising:

(a) means for storing data, said means being operatively associated with said first transistor switch for controlling the function of said first transistor switch;
(b) a data line; and
(c) a second transistor switch selectably conductively interconnecting said data line with said data storage means for effecting the transfer of data from said data line to said data storage means.

4. The circuit of claim 3 wherein said data storage means is a capacitor.

5. A liquid crystal matrix display comprising:
(a) a plurality of pairs of power electrodes;
(b) a plurality of opposing pairs of half-pixel electrodes, each pair of half-pixel electrodes being associated with a given pair of said power electrodes such that each half-pixel electrode opposes a respective one of said power electrodes; and
(c) a plurality of transistor switches, each said switch being operatively associated with a respective pair of said half-pixel electrodes so as to selectably conductively interconnect the half-pixel electrodes of said pair of half-pixel electrodes in response to a given data potential.

6. The device of claim 5 wherein said transistor switches are FETs, the sources and drains thereof being conductively connected to the respective half-pixel electrodes of the corresponding pairs of half-pixel electrodes.

7. The device of claim 6 wherein a power voltage potential is applied between the power electrodes of each pair of power electrodes, the magnitude and polarity of said power voltage varying with time.

8. The device of claim 6 further comprising:
(a) a plurality of data lines;
(b) a plurality of strobe lines;
(c) a plurality of strobe transistors; and
(d) a plurality of data storage means, each said strobe transistor being operatively associated with a unique combination of one of said data lines and one of said strobe lines and further associated with respective ones of said data storage means and said transistor switches, such that said strobe transistors enable the transfer of data signals from said data lines to their corresponding data storage means in response to strobe signals selectively provided on said strobe lines, said data storage means being operatively associated with their corresponding transistor switches a data potential thereto representative of the respective data signals.

9. The device of claim 8 wherein said data storage means are capacitors.

* * * * *